United States Patent
Toyoda et al.

(10) Patent No.: US 9,490,484 B2
(45) Date of Patent: *Nov. 8, 2016

(54) BINDER FOR STORAGE BATTERY DEVICE

(71) Applicant: ASAHI GLASS COMPANY, LIMITED, Chiyoda-ku (JP)

(72) Inventors: Mizuna Toyoda, Chiyoda-ku (JP); Takehiro Kose, Chiyoda-ku (JP); Hiroki Nagai, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/469,114

(22) Filed: Aug. 26, 2014

(65) Prior Publication Data

US 2014/0363715 A1 Dec. 11, 2014

Related U.S. Application Data

(63) Continuation of application No. PCT/JP2013/059369, filed on Mar. 28, 2013.

(30) Foreign Application Priority Data

Mar. 28, 2012 (JP) .................. 2012-072861

(51) Int. Cl.
*H01M 4/62* (2006.01)
*H01M 10/04* (2006.01)
(Continued)

(52) U.S. Cl.
CPC ............ *H01M 4/623* (2013.01); *C08F 210/06* (2013.01); *C08F 214/265* (2013.01);
(Continued)

(58) Field of Classification Search
CPC ........... H01M 4/623; H01M 10/0431; H01M 10/052; H01M 10/0566; C08F 214/265; C08F 210/06
USPC ............... 429/94, 217; 526/255; 524/546; 252/182.1
See application file for complete search history.

(56) References Cited

U.S. PATENT DOCUMENTS 3,718,558 A 2/1973 Tabata et al.
3,723,270 A 3/1973 Tabata et al.
(Continued)

FOREIGN PATENT DOCUMENTS

JP 8-31408 2/1996
JP 11-401612 2/1999
(Continued)

OTHER PUBLICATIONS

U.S. Appl. No. 14/524,856, Oct. 27, 2014, Kose, et al.
(Continued)

*Primary Examiner* — Karie O'Neil Apicella
(74) *Attorney, Agent, or Firm* — Oblon, McClelland, Maier & Neustadt, L.L.P.

(57) ABSTRACT

To provide a binder for a storage battery device, whereby good adhesion in an electrode and flexibility are obtainable, and it is possible to realize good charge and discharge characteristics when used for a secondary battery.

A binder for a storage battery device, which is made of a fluorinated copolymer comprising structural units (a) derived from tetrafluoroethylene and structural units (b) derived from propylene, wherein the molar ratio (a)/(b) is from 40/60 to 50/50, and the total of the structural units (a) and (b) is at least 90 mol % in all structural units.

10 Claims, 1 Drawing Sheet

(51) Int. Cl.
*C08F 214/26* (2006.01)
*C08F 210/06* (2006.01)
*H01M 10/0566* (2010.01)
*H01M 10/052* (2010.01)

(52) U.S. Cl.
CPC ...... *H01M 10/0431* (2013.01); *H01M 10/052* (2013.01); *H01M 10/0566* (2013.01); *H01M 2220/20* (2013.01); *H01M 2220/30* (2013.01)

(56) References Cited

U.S. PATENT DOCUMENTS

| | | | |
|---|---|---|---|
| 3,825,510 A | * | 7/1974 | Yamamoto et al. ..... C08K 5/14 525/377 |
| 5,609,975 A | | 3/1997 | Hasegawa et al. |
| 2012/0231332 A1 | | 9/2012 | Kose |
| 2014/0147745 A1 | | 5/2014 | Toyoda et al. |

FOREIGN PATENT DOCUMENTS

| | | | |
|---|---|---|---|
| JP | 2009-146871 | | 7/2009 |
| JP | 2010287497 A | * | 12/2010 .............. H01M 4/62 |
| KR | 10-2012-0027457 A | | 3/2012 |
| WO | 2011/055760 | | 5/2011 |

OTHER PUBLICATIONS

U.S. Appl. No. 14/657,475, filed Mar. 13, 2015, Kose, et al.
International Search Report issued in corresponding PCT/JP2013/059369, mailed May 21, 2013.
Extended European Search Report issued Oct. 5, 2015 in Patent Application No. 13768555.8.

* cited by examiner

BINDER FOR STORAGE BATTERY DEVICE

TECHNICAL FIELD

The present invention relates to a binder for a storage battery device, a binder composition for a storage battery device, an electrode mixture for a storage battery device, an electrode for a storage battery device and a secondary battery.

BACKGROUND ART

Heretofore, a fluorinated copolymer made of tetrafluoroethylene and propylene has been used as a rubber material excellent in heat resistance, voltage resistance, oxidation resistance and chemical resistance in a severe environment wherein usual rubber material is not durable.

It is known that in recent years, by taking advantage of the voltage resistance, oxidation resistance and chemical resistance of a fluorinated copolymer, the fluorinated copolymer has been used as a binder in a storage battery device such as a capacitor, a primary battery or a secondary battery for an electronic device or an electric car, for which a high output power, a high capacity and excellent cycle characteristics are required.

For example, Patent Document 1 discloses an example wherein a secondary battery was prepared by using, as a binder, a fluorinated copolymer wherein the molar ratio of structural units derived from tetrafluoroethylene/structural units derived from propylene was 56/44.

PRIOR ART DOCUMENT

Patent Document

Patent Document 1: WO2011/055760

DISCLOSURE OF INVENTION

Technical Problem

However, the binder used in the Example of Patent Document 1 is not necessarily sufficient in flexibility, although it is excellent in adhesion and charge and discharge characteristics when used for a secondary battery. Accordingly, if an electrode mixture layer is made thick or the binder content is decreased, for example to increase the proportion of an electrode active material in an electrode, the obtainable electrode mixture layer tends to be insufficient in the flexibility when an electrode is bent, thus leading to breakage or peeling of the electrode mixture layer.

It is an object of the present invention to provide a binder for a storage battery device, whereby good adhesion and flexibility are obtainable, and it is possible to realize good charge and discharge characteristics when used for a secondary battery, and a binder composition for a storage battery device, an electrode mixture for a storage battery device, an electrode for a storage battery device and a secondary battery, using such a binder.

Solution to Problem

The present invention provides a binder for a storage battery device, a binder composition for a storage battery device, an electrode mixture for a storage battery device, an electrode for a storage battery device and a secondary battery, having the following constructions [1] to [11].

[1] A binder for a storage battery device, which is made of a fluorinated copolymer comprising structural units (a) derived from tetrafluoroethylene and structural units (b) derived from propylene, wherein the molar ratio (a)/(b) is from 40/60 to 50/50, and the total of the structural units (a) and the structural units (b) is at least 90 mol % in all structural units.

[2] The binder for a storage battery device according to the above [1], wherein the Mooney viscosity of the fluorinated copolymer is from 5 to 200.

[3] A binder composition for a storage battery device, which comprises the binder for a storage battery device as defined in the above [1] or [2] and a medium.

[4] The binder composition for a storage battery device according to the above [3], wherein the medium is an aqueous medium, and particles made of the fluorinated copolymer are dispersed in the aqueous medium.

[5] The binder composition for a storage battery device according to the above [3] or [4], wherein the average particle size of the particles made of the fluorinated copolymer is from 10 to 200 nm.

[6] The binder composition for a storage battery device according to any one of the above [3] to [5], wherein the content of the fluorinated copolymer is from 5 to 60 mass %.

[7] The binder composition for a storage battery device according to any one of the above [3] to [6], which is in a state of a latex.

[8] An electrode mixture for a storage battery device, which comprises the binder composition for a storage battery device as defined in any one of the above [3] to [7] and an electrode active material.

[9] An electrode for a storage battery device, which comprises a current collector and an electrode active material layer formed on the current collector, wherein the electrode active material layer comprises the binder for a storage battery device as defined in the above [1] and an electrode active material.

[10] A secondary battery comprising the electrode for a storage battery device as defined in the above [9] and an electrolytic solution.

[11] The secondary battery according to the above [10], which is a wound secondary battery.

Advantageous Effects of Invention

By the electrode mixture for a storage battery device of the present invention containing the binder for a storage battery device or the binder composition for a storage battery device of the present invention, good adhesion in electrode active material and adhesion between electrode active material and a current collector are obtainable, good flexibility is obtainable, and it is possible to obtain good charge and discharge characteristics in a secondary battery.

According to the present invention, it is possible to obtain an electrode for a storage battery device whereby good adhesion in electrode active material and adhesion between electrode active material and a current collector are obtainable, good flexibility is obtainable, and good charge and discharge characteristics in a secondary battery can be realized, and a secondary battery comprising it.

DESCRIPTION OF EMBODIMENTS

Figure 1:
FIG. 1 is side view schematically illustrating an example of constitution of a positive electrode, a separator and a negative electrode in a wound secondary battery.

In this specification, the storage battery device may, for example, be a lithium-ion primary battery, a lithium-ion secondary battery, a lithium polymer battery, an electric double layer capacitor or a lithium-ion capacitor. The present invention is preferably applied particularly to a lithium-ion secondary battery since the adhesion, flexibility, charge and discharge characteristics, etc. can thereby be effectively obtainable.

<Binder for Storage Battery Device made of Fluorinated Copolymer>

The binder for a storage battery device of the present invention is characterized by being made of a fluorinated copolymer (f) comprising structural units (a) derived from tetrafluoroethylene (hereinafter referred to as TFE) and structural units (b) derived from propylene (hereinafter referred to as P) in a specific ratio. Such a fluorinated copolymer (f) may contain structural units derived from another monomer other than TFE and P, within a range not to impair the effects of the present invention.

Such another monomer may, for example, be a fluorinated olefin other than TFE (such as vinylidene fluoride, chlorotrifluoroethylene, monofluoroethylene, trifluoroethylene, trifluoropropylene, pentafluoropropylene, hexafluoropropylene, hexafluoroisobutylene or dichlorodifluoroethylene), a fluorinated vinyl ether (such as perfluoro(propyl vinyl ether), perfluoro(methyl vinyl ether), perfluoro(ethyl vinyl ether), perfluoro(3,6-dioxa-5-methyl-octene) or perfluoro(ethoxyethyl vinyl ether)); a hydrocarbon type monomer such as an α-olefin other than P (such as ethylene, 1-butene or isobutene), a vinyl ether (such as ethyl vinyl ether, butyl vinyl ether, hydroxybutyl vinyl ether or cyclohexyl vinyl ether) or a vinyl ester (such as vinyl acetate, vinyl benzoate or vinyl crotonate). As such another monomer, one type may be used alone, or two or more types may be used in combination.

In all structural units in the fluorinated copolymer (f), the total proportion of the structural units (a) and (b) is at least 90 mol %, and preferably at least 95 mol %, whereby good adhesion (bonding property) and excellent flexibility tend to be readily simultaneously obtainable when used as a binder for a storage battery device.

In the present invention, in the fluorinated copolymer (f), the ratio (a)/(b) of structural units (a) derived from TFE to structural units (b) derived from P is from 40/60 to 50/50 (molar ratio). The ratio is preferably from 40/60 to 48/52 (molar ratio), more preferably from 42/59 to 46/54 (molar ratio). When it is within such a range, good adhesion (bonding property) and excellent flexibility tend to be readily obtainable when used as a binder for a storage battery device. Further, good charge and discharge characteristics tend to be readily obtainable when used for a secondary battery.

The Mooney viscosity of the fluorinated copolymer (f) in the present invention is preferably from 5 to 200, more preferably from 10 to 170, most preferably from 20 to 100.

The Mooney viscosity is measured in accordance with JIS K6300 by using an L-type rotor having a diameter of 38.1 mm and a thickness of 5.54 mm at 100° C. by setting a preheating time to be 1 minute and a rotor rotational time to be 10 minutes, and it is an index for a molecular weight of a polymer material such as a rubber. The value of the Mooney viscosity being large indirectly indicates that the molecular weight is high. When the Mooney viscosity is within a range of from 5 to 200, good adhesion (bonding property) and excellent flexibility tend to be readily simultaneously obtainable when used as a binder for a storage battery device.

<Method for Producing Fluorinated Copolymer (f)>

The fluorinated copolymer (f) may be produced by a known polymerization method, particularly preferably by a radical polymerization method. The radical polymerization method is not particularly limited, and various radical polymerization methods may be used. For example, it may be a method wherein the reaction is initiated by using an organic or inorganic radical polymerization initiator, or a method wherein the reaction is initiated by e.g. light, heat or ionized radiation without using a radical polymerization initiator.

With respect to the polymerization system, the production may be made by a conventional polymerization method such as bulk polymerization, suspension polymerization, emulsion polymerization or solution polymerization.

When suspension polymerization, emulsion polymerization or solution polymerization is used, a liquid product containing the fluorinated copolymer (f) and a medium may be obtained. Such a liquid product may be used as it is, as a part or whole of the binder composition for a storage battery device.

Specifically, when suspension polymerization or emulsion polymerization is used, it is possible to obtain a fluorinated copolymer latex having particles made of the fluorinated copolymer (f) dispersed in an aqueous medium. Such a fluorinated copolymer latex may be used as a part or whole of the binder composition for a storage battery device.

When solution polymerization is used, it is possible to obtain a solution having a fluorinated copolymer (f) dissolved in a solvent. Such a solution may be used as a part or whole of the binder composition for a storage battery device. As the solvent for such solution polymerization, an organic solvent such as a fluorinated hydrocarbon, a chlorinated hydrocarbon, a fluorochloro hydrocarbon, an alcohol or a hydrocarbon may, for example, be mentioned.

As the method for producing the fluorinated copolymer (f), it is particularly preferred to use emulsion polymerization, since it is thereby easy to adjust the molecular weight and the copolymer composition, and the productivity is excellent.

[Method for Production by Emulsion Polymerization]

An embodiment for producing the fluorinated copolymer (f) by emulsion polymerization will be described.

In the emulsion polymerization, the fluorinated copolymer latex is obtained via an emulsion polymerization step wherein in the presence of an aqueous medium, an emulsifier and a radical polymerization initiator, a monomer mixture containing TFE and P is subjected to emulsion polymerization to form a fluorinated copolymer (f). As the case requires, the monomer mixture may contain other monomers in addition to TFE and P, and a pH-adjusting agent may be added in the emulsion polymerization step.

(Aqueous Medium)

The aqueous medium may be water alone, or a mixture of water and a water-soluble organic solvent. As the water-soluble organic solvent, a known compound may suitably be used which is soluble in water at an optional proportion. The water-soluble organic solvent is preferably an alcohol, and tert-butanol is particularly preferred.

The content of the water-soluble organic solvent in the aqueous medium should better be small. Specifically, the water-soluble organic solvent is less than 1 part by mass, preferably at most 0.5 part by mass, more preferably at most 0.1 part by mass, per 100 parts by mass of water.

It is particularly preferred to use, as the aqueous medium, water alone which contains no water-soluble organic solvent.

When the content of the water-soluble organic solvent is within the above-mentioned range, in a case where the obtainable fluorinated copolymer latex is used as a binder composition for a storage battery device, handling for e.g. operation environmental measures may be simplified depending upon the production process, such being desirable.

(Emulsifier)

As the emulsifier, a known emulsifier which is used in an emulsion polymerization method, may be suitably used. An ionic emulsifier is preferred, and an anionic emulsifier is more preferred, in that the mechanical and chemical stability of the latex will be thereby excellent.

As the anionic emulsifier, a conventional emulsifier known in an emulsion polymerization method, may be used. Specific examples include a hydrocarbon type emulsifier such as sodium lauryl sulfate, sodium dodecylbenzene sulfonate, a sodium alkyl sulfonate, a sodium alkylbenzene sulfonate, a sodium succinic acid dialkyl ester sulfonate or a sodium alkyldiphenyl ether disulfonate; a fluorinated alkylcarboxylate such as ammonium perfluorooctanoate or ammonium perfluorohexanoate; and a compound represented by the following formula (I) (hereinafter referred to as a compound (I)).

$$F(CF_2)pO(CF(X)CF_2O)qCF(X)COOA \quad (I)$$

In the formula (I), X is a fluorine atom or a $C_{1-3}$ perfluoroalkyl group, A is a hydrogen atom, an alkali metal atom or $-NH_4$, p is an integer of from 1 to 10, and q is an integer of 0 or from 1 to 3.

The following compounds may be mentioned as examples of the compound (I).

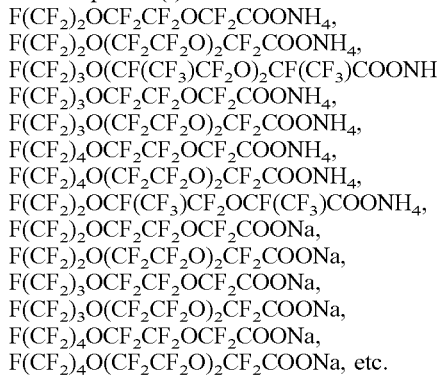

$F(CF_2)_2OCF_2CF_2OCF_2COONH_4$,
$F(CF_2)_2O(CF_2CF_2O)_2CF_2COONH_4$,
$F(CF_2)_3O(CF(CF_3)CF_2O)_2CF(CF_3)COONH_4$,
$F(CF_2)_3OCF_2CF_2OCF_2COONH_4$,
$F(CF_2)_3O(CF_2CF_2O)_2CF_2COONH_4$,
$F(CF_2)_4OCF_2CF_2OCF_2COONH_4$,
$F(CF_2)_4O(CF_2CF_2O)_2CF_2COONH_4$,
$F(CF_2)_2OCF(CF_3)CF_2OCF(CF_3)COONH_4$,
$F(CF_2)_2OCF_2CF_2OCF_2COONa$,
$F(CF_2)_2O(CF_2CF_2O)_2CF_2COONa$,
$F(CF_2)_3OCF_2CF_2OCF_2COONa$,
$F(CF_2)_3O(CF_2CF_2O)_2CF_2COONa$,
$F(CF_2)_4OCF_2CF_2OCF_2COONa$,
$F(CF_2)_4O(CF_2CF_2O)_2CF_2COONa$, etc.

As the anionic emulsifier, sodium lauryl sulfate is particularly preferred, since the polymerization properties and dispersion stability will be thereby excellent, and it is inexpensive.

The amount of the anionic emulsifier to be used is preferably from 1.5 to 5.0 parts by mass, more preferably from 1.5 to 3.8 parts by mass, particularly preferably from 1.7 to 3.2 parts by mass, per 100 parts by mass of the fluorinated copolymer (f) to be formed in the emulsion polymerization step.

When the content of the emulsifier in the fluorinated copolymer latex obtainable by emulsion polymerization is within such a range, the latex will be excellent in stability, and when such a latex is used as a binder composition for a storage battery device, excellent charge and discharge characteristics tend to be readily obtainable. If the content of the emulsifier is too much, the charge and discharge characteristics tend to be deteriorated.

(pH-Adjusting Agent)

The pH-adjusting agent is preferably an inorganic salt, and a known inorganic salt may be used as the pH-adjusting agent in the emulsion polymerization. The pH-adjusting agent may specifically be e.g. a phosphoric acid salt such as disodium hydrogenphosphate or sodium dihydrogenphosphate; or a carbonic acid salt such as sodium hydrogencarbonate or sodium carbonate. A more preferred specific example of the phosphoric acid salt may, for example, be disodium hydrogenphosphate dihydrate or disodium hydrogenphosphate dodecahydrate. Further, in order to adjust the pH to a desired level, a base such as sodium hydroxide or potassium hydroxide, or an acid such as sulfuric acid, hydrochloric acid or nitric acid may be used in combination.

The pH in the aqueous medium in the after-described emulsion polymerization step is preferably from 4 to 12, more preferably 6 to 11.

On the other hand, with a view to reducing the content of a metal component in the fluorinated copolymer latex, the amount of the pH-adjusting agent to be used should better be as small as possible.

The amount of use of the pH-adjusting agent if used is preferably from 0.001 to 15 parts by mass, more preferably from 0.1 to 10 parts by mass per 100 parts by mass of the fluorinated copolymer (f) formed in the emulsion polymerization step.

(Radical Polymerization Initiator)

As the radical polymerization initiator to be used for the emulsion polymerization, a water-soluble polymerization initiator is preferred. The water-soluble polymerization initiator may, for example, be a persulfate such as ammonium persulfate, or an organic initiator such as disuccinic acid peroxide or azobisisobutylamidine dihydrochloride. Among them, a persulfate such as ammonium persulfate is preferred.

The mechanism to initiate a radical polymerization reaction may be (i) a heat decomposition polymerization initiator system wherein heat is applied in the presence of a heat decomposition type radical polymerization initiator to cause radical decomposition, or (ii) a redox polymerization initiator system wherein a radical polymerization initiator and an oxidation-reduction catalyst (so-called redox catalyst) are used in combination.

In either system, the amount of the water-soluble polymerization initiator to be used is preferably from 0.0001 to 3 parts by mass, more preferably from 0.001 to 1 part by mass, per 100 parts by mass of the fluorinated copolymer (f) to be formed in the emulsion polymerization step.

As the heat decomposition type radical polymerization initiator to be used in (i) the heat decomposition polymerization initiator system, one which is water-soluble and of which one hour half-life temperature is from 50 to 100° C., may be employed. It may be suitably selected for use among water-soluble polymerization initiators which are commonly used for usual emulsion polymerization. Specifically, the heat decomposition type radical polymerization initiator may, for example, be a persulfate such as ammonium persulfate, sodium persulfate or potassium persulfate; disuccinic acid peroxide; or an organic initiator such as azobisisobutylamidine dihydrochloride. Among them, a persulfate is preferred, and ammonium persulfate is particularly preferred, whereby an appropriate polymerization rage will be obtainable.

As (ii) the redox polymerization initiator system, preferred is a system wherein ammonium persulfate, sodium hydroxymethane sulfinate, disodium ethylenediamine tetraacetate dihydrate and ferrous sulfate are used in combination, a system wherein potassium permanganate and oxalic acid are used in combination, a system wherein potassium bromate and ammonium sulfite are used in combination, or a system wherein ammonium persulfate and ammonium sulfite are used in combination. Among them, particularly preferred is a system wherein ammonium persulfate, sodium hydroxymethane sulfinate (also called Rongalite), disodium ethylenediamine tetraacetate dihydrate and ferrous sulfate are used in combination, whereby an appropriate polymerization rate will be obtainable.

As the radical initiator, more preferred is a heat decomposition type radical polymerization initiator, whereby the content of a metal component in the fluorinated copolymer latex will be low.

(Emulsion Polymerization Step)

The emulsion polymerization step may be conducted by a known emulsion polymerization method. For example, it may be conducted by the following procedure.

Firstly, a pressure-resistant reactor is deaerated, and then, into the reactor, an aqueous medium, an emulsifier, a radical polymerization initiator, if necessary a pH-adjusting agent, and, in a redox polymerization initiator system, a redox catalyst, are charged. Then, after raising the temperature to a predetermined polymerization temperature, a monomer mixture comprising TFE and P is injected under pressure to bring the pressure to a predetermined polymerization pressure. Further, if necessary, a catalyst (e.g. a Rongalite catalyst in the case of the redox polymerization initiator system) is supplied. When the polymerization initiator is activated and the polymerization reaction is initiated, the pressure in the reactor begins to decrease. That is, the initiation (the starting point of the reaction time) of the polymerization reaction can be confirmed by the decrease of the pressure.

After confirming the decrease of the pressure in the reactor, a monomer mixture comprising TFE and P is additionally supplied, and while maintaining the predetermined temperature and pressure, the polymerization reaction is conducted to form a fluorinated copolymer (f).

In this specification, the period from the start of supply of the monomer mixture to immediately before the additional supply of the monomer mixture after confirming the decrease of pressure in the reactor, is referred to as an initial activation period, and the period for forming the fluorinated copolymer (f) by additionally supplying the monomer mixture, is referred to as a polymerization reaction period.

In the polymerization reaction period, the composition of the monomer mixture to be additionally supplied into the reactor is set to be the same as the desired ratio (the target composition) of structural units in the fluorinated copolymer (f) to be obtained.

In the polymerization reaction period, when the total amount of the additionally supplied monomer mixture has reached a predetermined value, the interior of the reactor is cooled to stop the polymerization reaction (the terminal point of the reaction time), to obtain a fluorinated copolymer latex.

In the present invention, the total amount of monomers additionally supplied during the polymerization period is deemed to be equal to the amount of the fluorinated copolymer (f) to be formed in the emulsion polymerization step.

The composition of the monomer mixture to be supplied into the reactor during the initial activation period is calculated by the monomer reactivity ratio. In order to obtain a fluorinated copolymer (f) to satisfy the above-mentioned ratio (a)/(b) in the present invention, the ratio of monomers to be supplied during the initial activation period is preferably TFE/P=from 10/90 to 70/30 (molar ratio), more preferably from 12/88 to 65/35 (molar ratio), most preferably from 16/84 to 60/40 (molar ratio).

The polymerization temperature in the initial activation period is preferably the same as the polymerization temperature in the polymerization reaction period.

The polymerization pressure in the initial activation period is preferably the same as the polymerization pressure in the polymerization reaction period.

In the case of (i) the heat decomposition polymerization initiator system, the polymerization temperature during the polymerization reaction period is preferably from 50° C. to 100° C., more preferably from 60° C. to 90° C., particularly preferably from 65° C. to 80° C. When the polymerization temperature is within such a range, the polymerization rate will be proper and can easily be controlled, the productivity will be excellent, and good stability of the latex will be readily obtainable.

The polymerization pressure during the polymerization reaction period is preferably from 1.0 to 10 MPaG, more preferably from 1.5 to 5.0 MPaG, particularly preferably from 1.7 to 3.0 MPaG. When the polymerization pressure is within the above range, the polymerization rate will be proper and can easily be controlled, and the productivity will be excellent.

In the case of (ii) the redox polymerization initiator system, the polymerization temperature during the polymerization reaction period is preferably from 0° C. to 100° C., more preferably from 10° C. to 90° C., particularly preferably from 20° C. to 60° C. When the polymerization temperature is within such a range, the polymerization rate will be proper and can easily be controlled, the productivity will be excellent, and good stability of the latex will be readily obtainable.

The polymerization pressure during the polymerization reaction period is preferably from 1.0 to 10 MPaG, more preferably from 1.5 to 5.0 MPaG, particularly preferably from 1.7 to 3.0 MPaG. When the polymerization pressure is within the above range, the polymerization rate will be proper and can easily be controlled, and the productivity will be excellent.

A preferred embodiment is a method for producing a fluorinated copolymer (f), which has an emulsion polymerization step of subjecting a monomer mixture comprising tetrafluoroethylene and propylene to emulsion polymerization in the presence of the above aqueous medium, the above anionic emulsifier and the above redox type polymerization initiator within a polymerization temperature range of from 50° C. to 100° C. to form a fluorinated copolymer (f), wherein the above aqueous medium is composed of water only, or water and a water-soluble organic solvent; the content of the water-soluble organic solvent is less than 1 part by mass per 100 parts by mass of water; and the amount of the above anionic emulsifier to be used is from 0.5 to 10.0 parts by mass, particularly preferably from 1.5 to 5.0 parts by mass per 100 parts by mass of the fluorinated copolymer (f) to be formed.

By this method, a fluorinated copolymer latex is obtainable which is a fluorinated copolymer latex containing particles of the fluorinated copolymer (f) and the anionic emulsifier, wherein the above aqueous medium is composed of water only, or water and a water-soluble organic solvent; the content of the water-soluble organic solvent is less than 1 part by mass per 100 parts by mass of water; and the content of the above anionic emulsifier is from 0.5 to 10.0 parts by mass, particularly preferably from 1.5 to 5.0 parts by mass per 100 parts by mass of the fluorinated copolymer (f).

The average particle size of particles made of the fluorinated copolymer (f) contained in the latex is preferably from 10 to 200 nm, preferably from 20 to 150 nm, more preferably from 20 to 130 nm, particularly preferably from 30 to 100 nm. When the average particle size is within a range of from 10 to 200 nm, a good bonding force of the electrode active material tends to be readily obtainable. The average particle size of the copolymer particles may be adjusted by a known method e.g. by adjusting the type, amount, etc. of the emulsifier.

Here, the average particle size of particles of the fluorinated copolymer (f) in this specification is a value measured by a dynamic light scattering method by means of a laser zeta electrometer ELS-8000 manufactured by Otsuka Electronics Co., Ltd.

By using this fluorinated copolymer latex as a binder composition for a storage battery device, as will be shown in Examples given hereinafter, better adhesion and flexibility and good charge and discharge characteristics are obtainable.

<Binder Composition for Storage Battery Device>

The binder composition for a storage battery device (hereinafter sometimes referred to simply as the binder composition) of the present invention comprises a fluorinated copolymer (f) and a medium. The binder composition may further contain a fluorinated copolymer other than the fluorinated copolymer (f).

When the binder composition contains a fluorinated copolymer other than the fluorinated copolymer (f), such another fluorinated copolymer is a fluorinated copolymer containing the structural units (a) based on TFE and containing no structural unites (b) based on P, a fluorinated copolymer containing the structural units (b) and containing no structural unites (a), or a fluorinated copolymer containing neither of the structural units (a) nor structural unites (b). Preferred is a fluorinated copolymer containing the structural units (a) and containing no structural unites (b).

As the medium, the above-described aqueous medium or the organic solvent mentioned as the solvent in the above-mentioned solution polymerization, is preferred.

The binder composition of the present invention is preferably in a state of a latex in which particles made of the fluorinated copolymer are dispersed in the aqueous medium in view of the following 1) and 2). 1) Problems in handling for e.g. operation environmental measures by organic solvents in the production process can be reduced. 2) The particles made of the fluorinated copolymer are relatively stable dispersed, thus leading to easy handling.

The proportion of the fluorinated copolymer (f) contained in the binder composition of the present invention is preferably from 5 to 60 mass %, more preferably from 10 to 50 mass %, particularly preferably from 15 to 35 mass %, based on the entire binder composition. When the proportion of the fluorinated copolymer (f) in the entire binder composition is at least the lower limit value in the above range, at the time of preparing an electrode mixture by using such a binder composition mentioned hereinafter, a good viscosity of the electrode mixture tends to be readily obtainable, and a highly thick coating can be formed on a current collector. When the proportion of the fluorinated copolymer (f) is at most the upper limit value in the above range, at the time of preparing an electrode mixture by dispersing an electrode active material, etc. in the binder composition, good dispersion stability tends to be readily obtainable, and a good coating property of the electrode mixture tends to be readily obtainable.

The proportion of the fluorinated copolymer other than the fluorinated copolymer (f) in the binder composition is preferably from 0 to 30 mass %, more preferably from 0 to 10 mass %, particularly preferably 0%, based on the entire binder composition.

The method for producing the binder composition of the present invention is not particularly limited, but the fluorinated copolymer may be produced by e.g. the above-mentioned suspension polymerization, emulsion polymerization or solution polymerization, and the composition in such a state that the fluorinated copolymer after the polymerization is dissolved in an organic solvent or dispersed in an aqueous dispersion medium, may be used as it is. In such a case, the solvent or the dispersion medium in the polymerization will be the medium constituting the above-mentioned binder composition of the present invention. The binder composition of the present invention may contain other components such as the emulsifier, initiator, pH-adjusting agent, etc. used at the time of producing the fluorinated copolymer.

Otherwise, the binder composition of the present invention may be a composition obtained by flocculating the fluorinated copolymer latex obtained by the polymerization, followed by purification to obtain a solid, and dissolving the solid again in an organic solvent or dispersing it again in an aqueous dispersion medium.

In the binder composition of the present invention, the content of components other than the fluorinated copolymer and the medium is preferably at most 10 mass %, more preferably at most 1 mass %.

<Electrode Mixture for Storage Battery Device>

The electrode mixture for a storage battery device (sometimes referred to simply as "the electrode mixture" in this specification) of the present invention contains an electrode active material in addition to the binder composition of the present invention. If necessary, it may contain an electrically conductive material and other components.

The electrode active material to be used in the present invention is not particularly limited, and a known material may suitably be used.

As a positive electrode active material, a metal oxide such as $MnO_2$, $V_2O_5$ or $V_6O_{13}$; a metal sulfide such as $TiS_2$, $MoS_2$ or FeS; a lithium composite metal oxide containing a transition metal such as Co, Ni, Mn, Fe or Ti, such as $LiCoO_2$, $LiNiO_2$ or $LiMn_2O_4$; or a compound having a part of the transition metal in such a compound substituted by another metal; may be exemplified. Further, an electrically conductive polymer such as polyacetylene or poly-p-phenylene may also be used. Still further, one having a part or whole of the surface thereof covered with a carbon material or an inorganic compound may also be used.

As a negative electrode active material, a carbonate of a polymer compound such as coke, graphite, mesophase pitch microspheres, a phenol resin or polyparaphenylene; or a carbonaceous material such as vapour-grown carbon fibers or carbon fibers, may, for example, be mentioned. Further, a metal such as Si, Sn, Sb, Al, Zn or W which may be alloyed with lithium, may also be mentioned. As an electrode active material, one having an electrically conductive material deposited on a surface by a mechanical modification method may also be used.

In the case of an electrode mixture for a lithium-ion secondary battery, the electrode active material to be used, may be one capable of reversibly introducing and discharging lithium ions by applying an electric potential in an electrolyte, and either an inorganic compound or an organic compound may be used.

It is particularly preferred to incorporate an electrically conductive material to an electrode mixture to be used for the production of a positive electrode. By incorporating an electrically conductive material, the electrical contact in the electrode active material is improved to lower the electrical resistance in the active material layer, whereby the discharge rate of a non-aqueous secondary battery may be improved.

The electrically conductive material may, for example, be an electrically conductive carbon such as acetylene black, ketjen black, carbon black, graphite, vapour-grown carbon fibers or carbon nanotubes.

It is preferred that the electrode mixture contains an electrically conductive material, since the effect to reduce the electrical resistance is large with an addition of a small amount of an electrically conductive material.

As other components, components known for an electrode mixture may be used. Specific examples include water-soluble polymers such as carboxymethyl cellulose, polyvinyl alcohol, polyacrylic acid and polymethacrylic acid.

The proportion of the electrode active material in the electrode mixture of the present invention is preferably from 20 to 90 mass %, more preferably from 30 to 80 mass %, particularly preferably from 40 to 70 mass %.

The proportion of the fluorinated copolymer (f) in the electrode mixture is preferably from 0.1 to 20 mass %, more preferably from 0.5 to 10 mass %, particularly preferably from 1 to 8 mass %. The proportion of another fluorinated copolymer in the electrode mixture is preferably from 0 to 30 mass %, more preferably from 0 to 10 mass %, particularly preferably 0 mass %.

Further, in a case where the electrode mixture contains an electrically conductive material, the proportion of the electrically conductive material in the electrode mixture is preferably at most 20 mass %, more preferably from 1 to 10 mass %, particularly preferably from 3 to 8 mass %.

The solid content concentration in the electrode mixture is preferably from 30 to 95 mass %, more preferably from 40 to 85 mass %, particularly preferably from 45 to 80 mass %.

<Electrode for Storage Battery Device>

The electrode for a storage battery device of the present invention comprises a current collector and an electrode active material layer formed on the current collector. The electrode active material layer comprises the binder for a storage battery device of the present invention and an electrode active material.

The current collector is not particularly limited so long as it is made of an electrically conductive material, and it may usually be a metal foil, a metal net or a metal madreporite, of e.g. aluminum, nickel, stainless steel or copper. As a positive electrode current collector, aluminum is preferably used, and as a negative electrode current collector, copper is preferably used. The thickness of the current collector is preferably from 1 to 100 μm.

As a method for producing the electrode for a storage battery device, for example, the electrode mixture of the present invention is applied at least on one surface, preferably on both surfaces of a current collector, followed by drying to remove a medium in the electrode mixture thereby to form an electrode active material layer. If necessary, the electrode active material layer after the drying may be pressed to a desired thickness.

As a method for applying the electrode mixture to the current collector, various coating methods may be mentioned. For example, a doctor blade method, a dipping method, a reverse roll method, a direct roll method, a gravure method, an extrusion method and a brushing method may be mentioned. The coating temperature is not particularly limited, but usually a temperature in the vicinity of room temperature is preferred. The drying may be carried out by means of various drying methods, e.g. a warm air, hot air or low wet air drying method, a vacuum drying method and a drying method by irradiation with (far) infrared rays, electron rays, etc. The drying temperature is not particularly limited, but by a heating type vacuum drier, etc., a temperature of from room temperature to 200° C. is usually preferred. The pressing method may be carried out by means of a die press or a roll press.

The thickness of the electrode active material layer of the electrode for a storage battery device of the present invention is not particularly limited, and is preferably from 5 to 300 μm, more preferably from 10 to 200 μm, particularly preferably from 50 to 200 μm. The thicker the electrode active material layer is, the more problems such as peeling or breakage of the electrode active material layer by bending of the electrode tends to occur, whereby sufficient effects by the present invention tend to be obtainable.

<Lithium-ion Secondary Battery>

A lithium-ion secondary battery as a storage battery device has the electrode for a storage battery device of the present invention as an electrode of at least one of the positive electrode and the negative electrode and has an electrolytic solution. Further, it preferably has a separator.

As the separator, a known separator such as a microporous film containing a polyolefin resin such as polyethylene or polypropylene or an aromatic polyamide resin, or a non-woven fabric may be used. A separator may be coated with a porous resin containing an inorganic ceramic powder. Particularly preferred is a single layer of a microporous polyolefin resin such as a polyethylene resin or a polypropylene resin, or a laminate of a polyethylene resin sandwiched between polypropylene resin layers. Further, the thickness of the separator is preferably from 1 to 50 μm, particularly preferably from 1 to 20 μm.

The electrolytic solution comprises an electrolyte and a solvent. As the solvent, an aprotic organic solvent, e.g. an alkyl carbonate such as dimethyl carbonate (DMC), ethylene carbonate (EC), diethyl carbonate (DEC), propylene carbonate (PC), butylene carbonate (BC) or methylethyl carbonate (MEC); an ester such as γ-butyrolactone or methyl formate; an ether such as 1,2-dimethoxyethane or tetrahydrofuran; or a sulfur-containing compound such as sulfolane or dimethyl sulfoxide; may be used. Particularly preferred is dimethyl carbonate, ethylene carbonate, propylene carbonate, diethyl carbonate or methylethyl carbonate, whereby a high ion conductivity is obtainable, and the useful temperature range is wide. These solvents may be used alone, or two or more of them may be used as mixed.

The electrolyte may be a lithium salt such as $LiClO_4$, $LiBF_4$, $LiPF_6$, $LiAsF_5$, $CF_3SO_3Li$ or $(CF_3SO_2)_2NLi$.

The electrode for a storage battery device of the present invention is particularly effective when the electrode active material layer has good flexibility and the electrode is bent. In this regard, the electrode for a storage battery device of the present invention is suitable for application in which an electrode preferably has flexibility, for example, an electrode which is bent by a roll in the production process or an electrode which is used as wound or folded.

For example, the storage battery device of the present invention is preferably applied to a storage battery device equipped with a wound electrode, and a wound secondary batter and the like.

Figure 2:
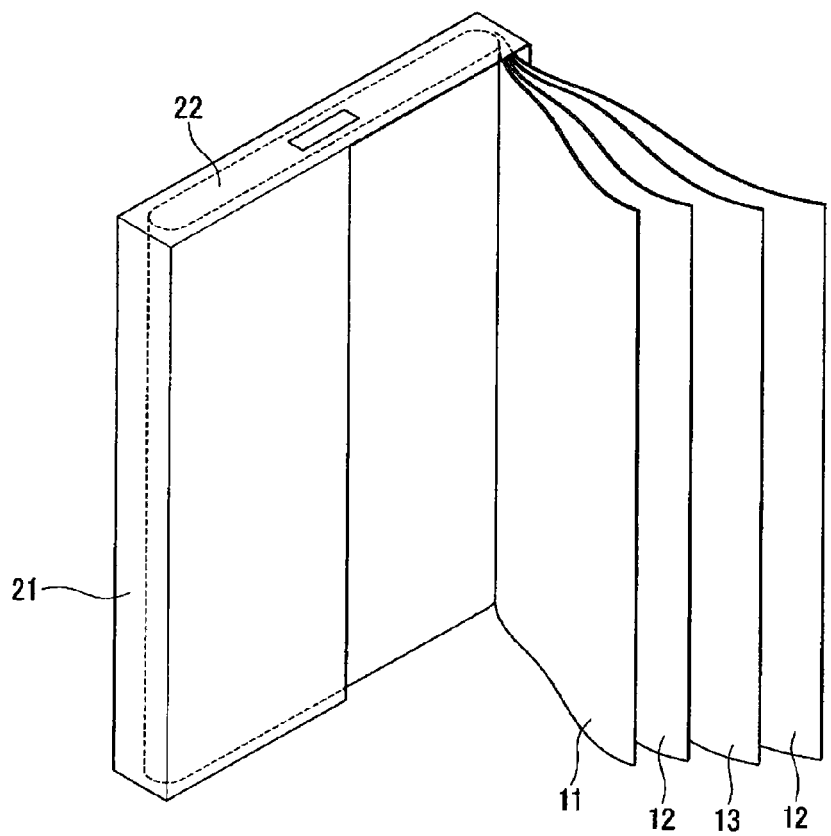
FIG. 2 is a view schematically illustrating an example of a wound secondary battery.

FIGS. 1 and 2 illustrate an example of a wound secondary battery, and FIG. 1 is a side view illustrating a constitution of a positive electrode 11, a separator 12 and a negative electrode 13, and FIG. 2 is a view illustrating the overall constitution.

The secondary battery in this example comprises an electrode group wound in a spiral, obtained by laminating a positive electrode 11, a separator 12 and a negative electrode 13 in order as shown in FIG. 1. The wound secondary battery shown in FIG. 2 is constituted in such a manner that the electrode group shown in FIG. 1 is accommodated in a battery case 21 made of a metal such as stainless steel, nickel-plated iron or aluminum, an electrolytic solution is injected into the battery case 21, and the opening of the battery case 21 is sealed by a sealing plate 22.

EXAMPLES

Now, the present invention will be described with reference to Examples, but it should be understood that the present invention is by no means limited to these Examples. The tests and evaluations in Examples and Comparative Examples were conducted by the following methods.

(1) Copolymer Composition of Fluorinated Copolymer

A fluorinated copolymer latex produced in each Example was added to a 1.5 mass % calcium chloride aqueous solution and salted out to flocculate and precipitate a fluorinated copolymer, which was washed with deionized water and then dried for 15 hours in an oven of 100° C. to obtain a fluorinated copolymer.

The copolymer composition (the molar ratio (a)/(b) of structural units (a) derived from TFE to structural units (b) derived from P) of the obtained fluorinated copolymer was calculated by a fluorine content analysis.

(2) Adhesion (Peel Strength)

An electrode (positive electrode) produced in each Example was cut in a strip form of 2 cm in width×10 cm in length and fixed so that the coating film surface of the electrode mixture faced upward. CELLOTAPE (tradename, manufactured by NICHIBAN CO., LTD.) was bonded to the coating film surface of the electrode mixture, and CELLOTAPE was peeled in a 90° direction to the coating film surface at a rate of 10 mm/min, whereby the strength (N) was measured. The measurement was repeated 5 times, and the average value was taken as the peel strength. The larger the value, the better the adhesion (bonding property) by the binder. That is, it indicates that the adhesion in the electrode active material and the adhesion between the electrode active material and the current collector bonded by the binder are excellent.

(3) Flexibility

An electrode (positive electrode) produced in each Example was cut into a strip of 2 cm×10 cm, and tested in such a manner that the strip was bent as being wound on a metal rod having a diameter of 1 mm so that the electrode surface faced outwardly, and the electrode surface after the test was visually observed to confirm breakage of the coating film of the electrode mixture. Such a test was conducted with respect to totally 100 electrodes, and the number of broken coating film of the electrode mixture was recorded. For example, a case where one coating film out of 100 electrodes was broken is represented as 1/100. An electrode of which the coating film of the electrode mixture was not broken is excellent in the flexibility.

(4) Charge and Discharge Characteristics (Capacity Retention Rate)

Evaluation of the charge and discharge characteristics of a secondary battery was conducted by the following method.

A positive electrode produced in each Example, and a lithium metal foil having the same area as the positive electrode, and a separator made of polyethylene were laminated in a 2016 type coin cell in the order of the lithium metal foil, the separator and the positive electrode to prepare a battery element. A non-aqueous electrolytic solution containing $LiPF_6$ at a concentration of 1 mol/L in ethylmethyl carbonate/ethylene carbonate (volume ratio: 1:1) was added thereto, and the cell was closed to obtain a coin type non-aqueous electrolytic solution secondary battery.

At 25° C., charging was carried out at a constant current corresponding to 0.2 C to 4.3V (the voltage represents a voltage against lithium), and charging was further carried out until the current value became 0.02 C at the charging upper limit voltage, and then, discharging was carried out at a constant current corresponding to 0.2 C to 3V, to complete a cycle. The capacity retention rate (unit: %) of the discharge capacity at the 100th cycle to the discharge capacity at the first cycle was obtained and used as an index for measurement of the charge and discharge of the battery. The higher the value of the capacity retention rate, the better the charge and discharge characteristics.

Here, 1 C represents a current value to discharge a standard capacity of a battery in one hour, and 0.5 C represents a current value of ½ thereof.

Example 1

Production of Fluorinated Copolymer A

In this Example, a redox polymerization initiator was used.

That is, the interior of a stainless steel pressure resistant reactor having an internal capacity of 3200 mL and equipped with stirring anchor vanes, was deaerated, and then, to the reactor, 1,700 g of deionized water, 13.3 g (2.7 parts by mass per 100 parts by mass of fluorinated copolymer A to be formed) of sodium lauryl sulfate as an emulsifier, 60 g of disodium hydrogenphosphate dodecahydrate and 0.9 g of sodium hydroxide, as pH-adjusting agents, and 16.8 g of ammonium persulfate (one hour half-life temperature: 82° C.) as an initiator, were added. Further, an aqueous solution having 0.4 g of disodium ethylenediamine tetraacetate dihydrate (hereinafter referred to as EDTA) as a redox catalyst and 0.3 g of ferrous sulfate heptahydrate dissolved in 200 g of deionized water, was added to the reactor. The pH of the aqueous medium in the reactor was 9.2 at that time.

Then, at 40° C., a monomer mixture gas of TFE/P=60/40 (molar ratio) was injected under pressure so that the internal pressure of the reactor became 2.50 MPaG. By rotating anchor vanes at 300 rpm, sodium hydroxymethane sulfinate dihydrate (hereinafter referred to as Rongalite) having the pH adjusted to 10.0 with sodium hydroxide, was added to the reactor to initiate a polymerization reaction.

By maintaining the polymerization temperature at 40° C., the polymerization was permitted to proceed, and since the pressure in the reactor decreases along with the progress of the polymerization, when the internal pressure of the reactor decreased to 2.49 MPaG, a monomer mixture gas of TFE/P=50/50 (molar ratio) was injected by the self pressure to raise the internal pressure of the reactor to 2.51 MPaG. This operation was repeated to maintain the internal pressure of the reactor to be from 2.49 to 2.51 MPaG, and the polymerization reaction was continued. When the total amount of the injected amount of the monomer mixture gas of TFE/P became 500 g, the internal temperature of the reactor was cooled to 10° C. to stop the polymerization reaction and to obtain a latex containing a fluorinated copolymer A. The content of the fluorinated copolymer A in the latex was 22 mass %.

The copolymer composition of the fluorinated copolymer (f) A was (a)/(b)=50/50 (molar ratio).

Further, the Mooney viscosity and the average particle size of the fluorinated copolymer A are shown in Table 1 (the same applies hereinafter).

By using the obtained fluorinated copolymer A latex as a binder composition, an electrode mixture was prepared.

That is, 100 parts by mass of $LiCoO_2$ (trade name "Selion C" manufactured by AGC Seimi Chemical Co., Ltd, tap density: 2.4 $g/cm^3$, average particle size: 12 μm) as a positive electrode active material and 7 parts by mass of acetylene black as an electrically conductive material, were mixed, and as a viscosity-adjusting agent, 40 parts by mass of a carboxymethyl cellulose aqueous solution having a concentration of 1 mass % was added, followed by kneading, and then, 5 parts by mass of the fluorinated copolymer A latex was added thereto to obtain an electrode mixture 1.

The obtained electrode mixture 1 was applied to an aluminum foil (current collector) having a thickness of 15 μm by means of a doctor blade, so that the thickness after drying would be 120 μm, then dried in a vacuum drier at 120° C. and then pressed by a roll press to a thickness of 100 μm, and cut into a size of 1.5 cm×2.0 cm to obtain a positive electrode 1.

By the above-mentioned methods, the adhesion, flexibility and charge and discharge characteristics were evaluated. The evaluation results are shown in Table 1 (the same applies hereinafter).

Example 2

Production of Fluorinated Copolymer B

A latex of a fluorinated copolymer B was obtained in the same manner as in Example 1, except that in Example 1, the proportion of the monomer mixture gas firstly injected to the reactor was changed from TFE/P=60/40 (molar ratio) to TFE/P=30/70 (molar ratio), and the proportion of the monomer mixture gas injected during the progress of the polymerization was changed from TFE/P=50/50 (molar ratio) to TFE/P=45/55 (molar ratio). The content of the fluorinated copolymer B in the latex was 22 mass %. The copolymer composition of the fluorinated copolymer B was (a)/(b)=45/55 (molar ratio). The amount of the emulsifier used was 2.7 parts by mass per 100 parts by mass of fluorinated copolymer B formed. Further, in the same manner as in Example 1, an electrode mixture 2 and a positive electrode 2 were prepared and evaluated in the same manner.

Example 3

Production of Fluorinated Copolymer C

A latex of a fluorinated copolymer C was obtained in the same manner as in Example 1, except that in Example 1, the proportion of the monomer mixture gas firstly injected to the reactor was changed from TFE/P=60/40 (molar ratio) to TFE/P=16/84 (molar ratio), and the proportion of the monomer mixture gas injected during the progress of the polymerization was changed from TFE/P=50/50 (molar ratio) to TFE/P=40/60 (molar ratio). The content of the fluorinated copolymer C in the latex was 22 mass %. The copolymer composition of the fluorinated copolymer C was (a)/(b)=40/60 (molar ratio). The amount of the emulsifier used was 2.7 parts by mass per 100 parts by mass of fluorinated copolymer C formed. Further, in the same manner as in Example 1, an electrode mixture 3 and a positive electrode 3 were prepared and evaluated in the same manner.

Comparative Example 1

A latex of a fluorinated copolymer D was obtained in the same manner as in Example 1, except that in Example 1, the proportion of the monomer mixture gas firstly injected to the reactor was changed from TFE/P=60/40 (molar ratio) to TFE/P=14/86 (molar ratio), and the proportion of the monomer mixture gas injected during the progress of the polymerization was changed from TFE/P=50/50 (molar ratio) to TFE/P=38/62 (molar ratio). The content of the fluorinated copolymer D in the latex was 22 mass %. The copolymer composition of the fluorinated copolymer D was (a)/(b)=38/62 (molar ratio). The amount of the emulsifier used was 2.7 parts by mass per 100 parts by mass of the fluorinated copolymer D formed. Further, in the same manner as in Example 1, an electrode mixture 4 and a positive electrode 4 were prepared and evaluated in the same manner.

Comparative Example 2

A latex of a fluorinated copolymer E was obtained in the same manner as in Example 1, except that in Example 1, the proportion of the monomer mixture gas firstly injected to the reactor was changed from TFE/P=60/40 (molar ratio) to TFE/P=88/12 (molar ratio), and the proportion of the monomer mixture gas injected during the progress of the polymerization was changed from TFE/P=50/50 (molar ratio) to TFE/P=56/44 (molar ratio). The content of the fluorinated copolymer E in the latex was 22 mass %. The copolymer composition of the fluorinated copolymer E was (a)/(b)=56/44 (molar ratio). The amount of the emulsifier used was 2.7 parts by mass per 100 parts by mass of the fluorinated copolymer E formed. Further, in the same manner as in Example 1, an electrode mixture 5 and a positive electrode 5 were prepared and evaluated in the same manner.

TABLE 1

|  | Example/Comparative Example | | | | |
| --- | --- | --- | --- | --- | --- |
|  | Ex. 3 | Ex. 2 | Ex. 1 | Comp. Ex. 1 | Comp. Ex. 2 |
| Fluorinated copolymer | C | B | A | D | E |
| Molar ratio of (a)/(b) | 40/60 | 45/55 | 50/50 | 38/62 | 56/44 |
| Mooney viscosity | 70 | 60 | 50 | 60 | 60 |
| Average particle size (nm) | 45 | 42 | 40 | 50 | 80 |

TABLE 1-continued

| | | Example/ Comparative Example | | | | |
|---|---|---|---|---|---|---|
| | | Ex. 3 | Ex. 2 | Ex. 1 | Comp. Ex. 1 | Comp. Ex. 2 |
| Adhesion | Peel strength (N) | 0.8 | 0.9 | 0.8 | 0.9 | 0.6 |
| Flexibility | Bending test | 1/100 | 2/100 | 4/100 | 1/100 | 10/100 |
| Charge and discharge characteristics | Capacity retention rate (%) | 96 | 97 | 96 | 92 | 95 |

As shown by the results in Table 1, in Examples 1 to 3 wherein the molar ratio (a)/(b) of structural units (a) derived from TFE to structural units (b) derived from P is within the range of the present invention, more excellent adhesion by the binder for a storage battery device and flexibility are obtained than in Comparative Example 2. Further, in Comparative Example 1 in which the proportion of structural units (a) is lower than the range of the present invention, the capacity retention rate of a secondary battery was decreased.

INDUSTRIAL APPLICABILITY

The binder for a storage battery device of the present invention is widely useful for production of a lithium-ion primary battery, a lithium-ion secondary battery, a lithium polymer battery, an electric double layer capacitor, a lithium-ion capacitor, etc.

This application is a continuation of PCT Application No. PCT/JP2013/059369 filed Mar. 28, 2013, which is based upon and claims the benefit of priority from Japanese Patent Application No. 2012-072861 filed on Mar. 28, 2012. The contents of those applications are incorporated herein by reference in their entireties.

REFERENCE SYMBOLS

11: Positive electrode
12: Separator
13: Negative electrode
21: Battery case
22: Sealing plate

What is claimed is:

1. A binder composition for a storage battery device, comprising:
    a binder which comprises a fluorinated copolymer comprising structural units (a) derived from tetrafluoroethylene and structural units (b) derived from propylene, wherein the molar ratio (a)/(b) is from 40/60 to 48/52, and the total of the structural units (a) and the structural units (b) is at least 90 mol % with respect to all structural units included in the binder; and
    a medium,
    wherein the medium is an aqueous medium, and particles made of the fluorinated copolymer are dispersed in the aqueous medium, and the average particle size of the particles made of the fluorinated copolymer is from 10 to 200 nm.

2. The binder composition according to claim 1, wherein the Mooney viscosity of the fluorinated copolymer is from 5 to 200.

3. The binder composition according to claim 1, wherein the content of the fluorinated copolymer is from 5 to 60 mass %.

4. The binder composition according to claim 1, wherein the binder composition is in a state of a latex.

5. An electrode mixture, comprising the binder composition as defined in claim 1 and an electrode active material.

6. An electrode, comprising a current collector and an electrode active material layer formed on the current collector, wherein the electrode active material layer comprises the binder composition as defined in claim 1 and an electrode active material.

7. A secondary battery comprising the electrode as defined in claim 6 and an electrolytic solution.

8. The secondary battery according to claim 7, wherein the secondary battery is a wound secondary battery.

9. The binder composition according to claim 1, further comprising an anionic emulsifier.

10. The binder composition according to claim 9, wherein an amount of the anionic emulsifier is 1.5 to 5.0 weight parts by mass based on 100 parts by mass of the fluorinated copolymer.

* * * * *